United States Patent [19]

Yamamoto et al.

[11] Patent Number: 4,597,546
[45] Date of Patent: Jul. 1, 1986

[54] WEBBING RETRACTOR

[75] Inventors: Toshimasa Yamamoto; Takayuki Ando, both of Niwa, Japan

[73] Assignee: Kabushiki Kaisha Takai-Rika-Denki-Seisakusho, Aichi, Japan

[21] Appl. No.: 802,624

[22] Filed: Nov. 29, 1985

Related U.S. Application Data

[63] Continuation of Ser. No. 734,763, May 15, 1985, abandoned, which is a continuation of Ser. No. 549,689, Nov. 7, 1983, abandoned.

[30] Foreign Application Priority Data

Nov. 29, 1982 [JP] Japan .............................. 57-180495[U]
Sep. 26, 1983 [JP] Japan .............................. 58-148315[U]

[51] Int. Cl.⁴ ............................................. A62B 35/02
[52] U.S. Cl. ...................... 242/107.4 A; 242/107.4 R
[58] Field of Search ................ 242/107.4 A, 107.4 B, 242/107.4 D, 107.7

[56] References Cited

U.S. PATENT DOCUMENTS

| | | | |
|---|---|---|---|
| 3,598,336 | 8/1971 | Frost | 242/107.4 D |
| 3,858,826 | 1/1975 | Sprecher | 242/107.7 |
| 3,897,913 | 8/1975 | Hall | 242/107.4 A |
| 3,999,723 | 12/1976 | Magyar | 242/107.4 D X |
| 4,436,255 | 3/1984 | Matsui | 242/107.4 A |
| 4,463,917 | 8/1984 | Mori et al. | 242/107.4 B |

Primary Examiner—Stuart S. Levy
Assistant Examiner—Katherine Matecki
Attorney, Agent, or Firm—Sixbey, Friedman & Leedom

[57] ABSTRACT

In a webbing retractor used for a seatbelt system protecting an occupant in an emergency situation of a vehicle, a locking wheel is rotated, following a rotation of a webbing takeup shaft, and a locking means prevents the takeup shaft from webbing-unwinding rotation when lag in rotation of the locking wheel occurs relative to the takeup shaft in the emergency situation of the vehicle. Opposed to the locking wheel is a control means which can be biased selectively in either direction of approach to the locking wheel or direction of separation therefrom in accordance with a webbing-winding amount and a webbing-unwinding amount.

Accordingly, the webbing retractor can be used properly as an Automatic Locking Retractor and an Emergency Locking Retractor at need.

7 Claims, 16 Drawing Figures

WEBBING RETRACTOR

This application is a continuation of application Ser. No. 734,763 filed May 15, 1985 which in turn is a continuation of Ser. No. 549,689 filed Nov. 7, 1983, both now abandoned.

BACKGROUND OF THE INVENTION

1. Field of the Invention

The present invention relates to a webbing retractor for winding an occupant restraining webbing, used in a seatbelt system for protecting an occupant in an emergency situation of a vehicle.

2. Description of the Prior Art

The webbing retractor, applied to the seatbelt system for protecting the occupant of the vehicle to wind the end portion of the occupant restraining webbing, is constructed so as to wind the webbing by a biasing force and store it therein.

Among such webbing retractors, in a webbing retractor provided with an automatic locking mechanism for automatically stopping an additional unwinding of the webbing after the occupant wears the webbing, so-called Automatic Locking Retractor (ALR), the occupant is always restrained securely by the webbing, so that it is difficult to change position.

Also, in a webbing retractor provided with an emergency locking mechanism for stopping the unwinding of the webbing when an emergency situation of the vehicle is detected by an acceleration sensor, so-called Emergency Locking Retractor (ELR), the occupant can change his attitude easily in the ordinary running situation of the vehicle but, in case that a baggage, a vessel for receiving a child or the like is fixed to a seat of the vehicle by the webbing, it is moved sometimes. That is to say, the webbing is unwound unnecessarily from the webbing retractor by a vibration or the like due to a low acceleration range where the acceleration sensor is not worked or the movement of the child received in the vessel, so that the baggage, the vessel or the like is moved on the seat. In addition, the ELR provided with a manual locking mechanism for manually locking the emergency locking mechanism to stop the webbing unwinding rotation of the take up shaft at need has been proposed in this field. However, such a manual locking mechanism is generally mounted on the webbing retractor as an optional part and, therefore, an operation lever for the manual locking mechanism must be arranged in a small space where the lever is difficult to operate, for example, under the seat, whereby the operation of the lever is complicated. Also, in order to remote-control the manual locking mechanism such a connecting means as a wire must be arranged in the vehicle body.

SUMMARY OF THE INVENTION

In view of the above-described facts, the present invention has as its object the provision of a webbing retractor which is able to be used as an ALR or an ELR at need.

In the webbing retractor according to the present invention, an acceleration sensor gives a rotation-resistance to a locking wheel so as to prevent a webbing from being unwound from a take up shaft in an emergency situation of a vehicle, and in an ordinary running situation of the vehicle a control means is biased so as to separate from the locking wheel when the winding amount of the webbing exceeds a predetermined value and is biased so as to approach the locking wheel when the unwinding amount of the webbing exceeds another predetermined value.

Description will hereinunder be given of embodiments of the present invention with reference to the attached drawings.

DESCRIPTION OF THE PREFERRED EMBODIMENTS

Figure 1:
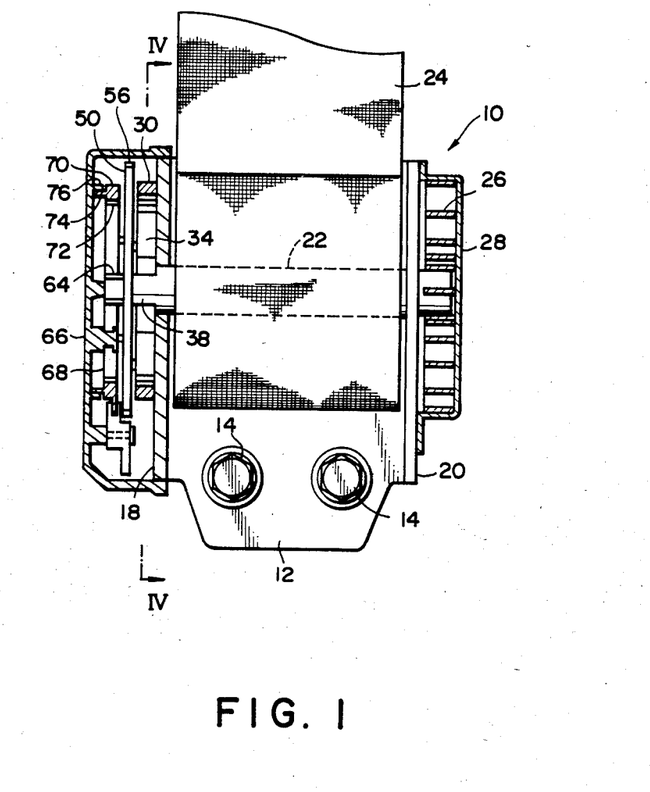
FIG. 1 is a front view showing a webbing retractor of a first embodiment of the present invention.
Figure 2:
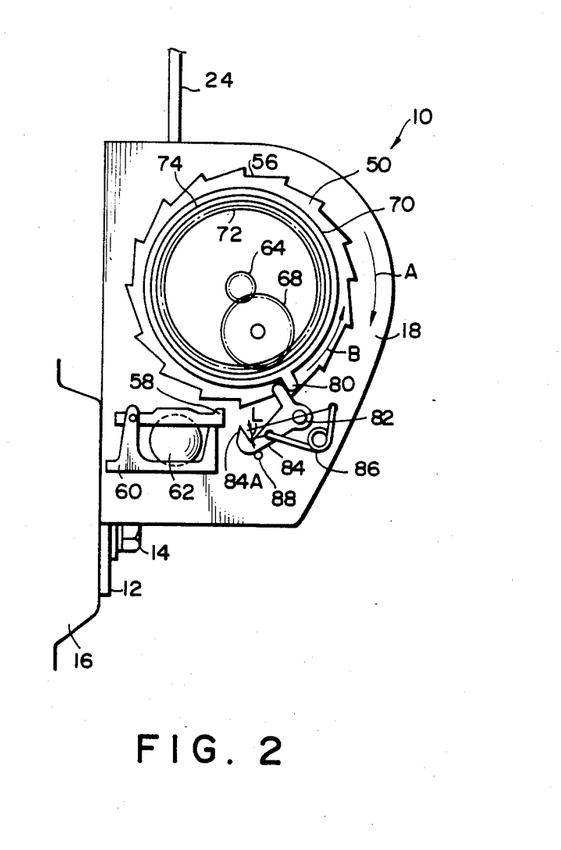
FIG. 2 is a left side view of the webbing retractor shown in FIG. 1 from which a cover is removed.

As shown in FIGS. 1 and 2, a webbing retractor 10 according to a first embodiment of the present invention is fixed at its frame 12 to a vehicle body 16 through fitting bolts 14.

A pair of leg plates 18, 20 extend from both the side portions of the frame 12 in parallel with one another and both the end portions of a takeup shaft 22 is rotatably supported by them. Wound in layers on to a central portion of the takeup shaft 22 is one end of an occupant-restraining webbing 24, the other end of which is fixed to another part of the vehicle body through a tongue-plate, a buckle unit or the like, not shown, whereby an intermediate portion of the webbing 24 can be worn by an occupant.

The end portion of the takeup shaft 22 penetrating the leg plate 20 is engaged with an inner end of a spiral spring 26, the outer end of which is engaged with a spring case 28 fixed to the leg plate 20. The takeup shaft 22 is biased in the wound, or retracted, direction of the webbing 24 by the spiral spring 26.

Figure 3:
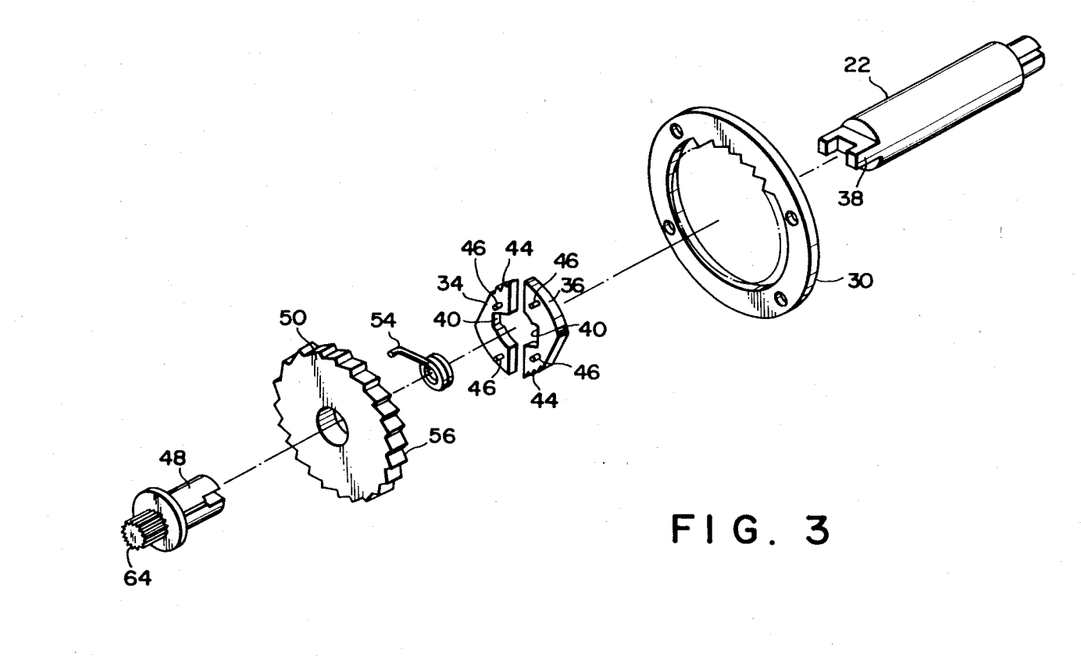
FIG. 3 is a disassembled perspective view of a main portion of the webbing retractor shown in FIG. 1.
Figure 4:
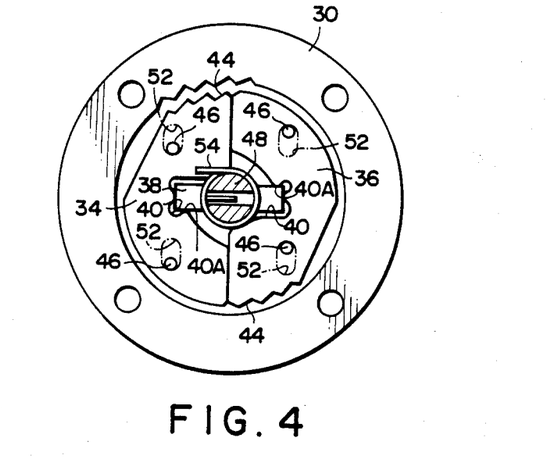
FIG. 4 is a front view showing a locking plate and the structure relating thereto corresponding to a sectional view taken along the line IV—IV in FIG. 1.

Fixed to the outer face of the leg plate 18 through a plurality of rivets is an internal gear ratchet wheel 30. Opposed to the internal gear of the internal gear ratchet wheel 30 are a pair of lock plates 34, 36, as shown in FIGS. 3 and 4. The lock plates 34, 36 are formed at the central portions thereof with recesses 40, respectively, for receiving rectangular projection 38 as being radial projection of the takeup shaft 22, whereby the general configuration of each of the lock plates 34, 36 is of a substantial C-shape.

Figure 5:
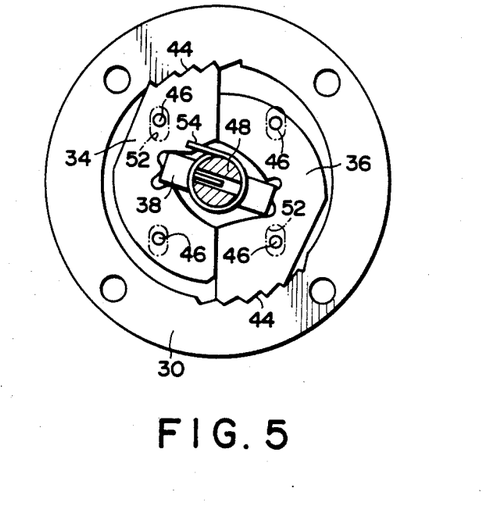
FIG. 5 is an operational view of FIG. 4.
Figure 6:
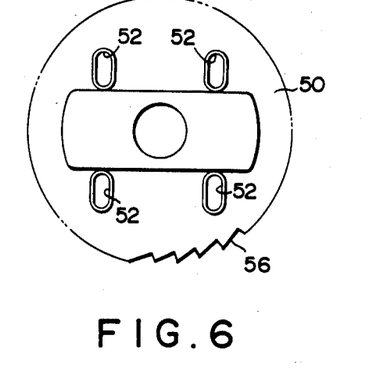
FIG. 6 is a reverse side view of a locking wheel.

Formed at portions of the outer peripheries of the pair of lock plates 34, 36 are locking clicks 44, which come into mesh with the internal gear ratchet wheel 30 when the lock plates 34, 36 move in directions opposite to one another, so that the unwinding rotation of the takeup shaft 22 is stopped, as shown in FIG. 5. A pair of pins 46 are projected from one side face of each of the lock plates 34, 36 in parallel with the takeup shaft 22.

Disposed coaxially with the rectangular projection 38 of the takeup shaft 22 is a pivot 48 which is rotated together with the takeup shaft 22. A locking wheel 50 is supported to the pivot 48 in a manner to be rotatable relative to the pivot 48, and four long slots 52 are formed on the face of the locking wheel 50 at the side of the lock plates 34, 36. The pins 46 projected from the respective lock plates 34, 36 are received in the slots 52, so that the pair of lock plates 34, 36 can be moved in directions opposite to each other by a stroke of each of the slots 52.

Also, a torsion coil spring 54 is confined between the locking wheel 50 and the pivot 48, whereby the locking wheel 50 is biased in the clockwise direction relative to the takeup shaft 22, as shown in FIG. 4. In consequence, when the takeup shaft 22 is rotated in the unwound direction of the webbing 24 below a predetermined value of acceleration, the locking wheel 50 is subjected to a biasing force of the torsion coil spring 54 to rotate in unison with the takeup shaft 22, following the rotation of the takeup shaft 22. However, when an acceleration of the webbing unwinding rotation of the takeup shaft 22 exceeds the predetermined value, the torsion coil spring 54 is deflected to cause a lag in rotation of the locking wheel 50 relative to the takeup shaft 22. When the lag in rotation occurs, the takeup shaft 22 causes the lock plates 34, 36 to move in the directions opposite to each other, as shown in FIG. 5, and during the movement of the lock plates 34, 36 the pins 46 of the lock plates 34, 36 are moved in the slots 52. Thus, locking members for locking the takeup shaft 22 consist substantially of the locking wheel 50, the lock plates 34, 36 and the internal gear ratchet wheel 30.

In addition, during a normal, or ordinary, condition where the takeup shaft 22 does not perform a violent webbing unwinding rotation, the pins 46 of the lock plates 34, 36 abut upon ends of the respective slots 52 at one side and portions of the recesses 40 as being stoppers 40A abut upon the rectangular projection 38 of the takeup shaft 22, as shown in FIG. 4.

Formed on the outer periphery of the locking wheel 50 are ratchet teeth 56 which is opposed to a pawl 58 rotatably supported to the leg plate 18. The pawl 58 is pushed up by an inertial ball 62 received in a case 60 mounted on the leg plate 18 to come into mesh with one of the ratchet teeth 56. The pawl 58 is separated from the ratchet teeth 56 due to the self-weight of the pawl 58 in an ordinary running situation of the vehicle, but, when an acceleration of the vehicle reaches a predetermined value, the inertial ball 62 is moved to cause the pawl 58 to come into mesh with one of the ratchet teeth 56, to thereby give a resistant force to the webbing-unwinding directional rotation of the locking wheel 50, which results in lag in rotation of the locking wheel 50 relative to the takeup shaft 22. Thus, the inertial ball 62 functions as an acceleration sensor.

Besides such an inertial body as the above-stated ball, a pendulum, a member falling down at a predetermined acceleration or the like can also be used as the acceleration sensor in the present invention.

Fixed coaxially to the pivot 48 is a pinion 64 which is rotated together with the takeup shaft 22. The pinion 64 is in mesh with another pinion 68 rotatably supported to a cover 66 mounted on to the outer face of the leg plate 18, and the pinion 68 is in mesh with an internal gear 72 of a rotatable ring 70. The rotatable ring 70 is formed with a supporting ring 74 projected coaxially with the rotatable ring 70 in a direction of the cover 60 and is received in an arc convex stripe 76 projected from the cover 66, by which the rotatable ring 70 is supported coaxially with the takeup shaft 22. Thus, the rotation of the takeup shaft 22 is subjected to speed reduction through the pinions 68 and 64 and is transmitted to the rotatable ring 70.

Projected from a portion of the outer periphery of the rotatable ring 70 is an engaging projection 80 which is opposed to one end of an arm 84 pivoted to the leg plate 18 through a pin 82. The other end of the arm 84 is formed with an engaging click 84A which is opposed to the ratchet teeth 56 of the locking wheel 50.

Figure 7:
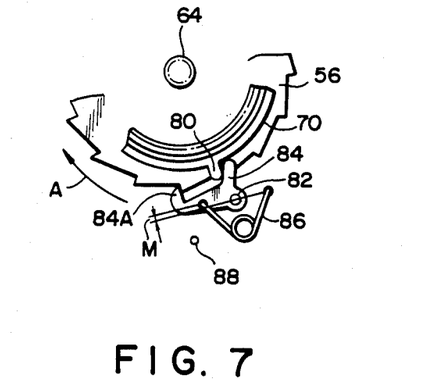
FIG. 7 is an operational view of FIG. 2.

Confined between the arm 84 and the leg plate 18 is a torsion coil spring 86, whereby either the condition shown in FIG. 2, i.e. the engaging click 84A being biased in the direction of separation from the ratchet teeth 56, or the condition shown in FIG. 7, i.e. the engaging click 84A being biased in the direction of approach to the ratchet teeth 56, can be applied to the arm 84, selectively.

That is to say, in the condition shown in FIG. 2 the end of the torsion coil spring 86 fixed to the arm 84 is positioned at the opposite side to the ratchet teeth 56 in the amount of L regarding a line passing the end of the torsion coil spring 86 fixed to the leg plate 18 and the axial center of the pin 82. As a result, the arm 84 is subjected to a biasing force of the torsion coil spring 86 in the direction of separation from the ratchet teeth 56 and is caused to abut on a stopper 88 projected from the leg plate 18, to thereby be stopped.

On the other hand, in the condition shown in FIG. 7 the end of the torsion coil spring 86 fixed to the arm 84 is positioned at the side of the ratchet teeth 56 in the amount of M regarding the above-described line. Therefore, the arm 84 is subjected to a biasing force of the torsion coil spring 86 in the direction of approach to the ratchet teeth 56 and is in mesh with the ratchet teeth 56.

Also, the condition of FIG. 2 shows the condition that the webbing 24 is wholly wound on to the takeup shaft 22 in its maximum amount, i.e. the occupant does not wear the webbing 24 but the webbing 24 is stored in the webbing retractor 10. Just before the webbing 24 is put in its stored condition, the engaging projection 80 of the rotatable ring 70 rotating in the direction of an arrow A causes the arm 84 to move from the condition of FIG. 7 to the condition of FIG. 2 through a boundary point where both the ends of the torsion coil spring 84 and the axial center of the pin 82 stand in a line.

In addition, the engaging projection 80 of the rotatable ring 70 is rotated in the direction of an arrow B in accordance with the webbing-unwinding rotation of the takeup shaft 22 and, when the webbing 24 is unwound in its substantially maximum amount, the engaging projection 80 abuts on the reverse side of the projection of the arm 84, i.e. the side reverse to the side shown in FIG. 2, as shown in FIG. 7, to thereby move the arm 84 from the condition of FIG. 2 to the condition of FIG. 7. The engaging projection 80 does not contact with the arm 84 while the rotatable ring 70 is rotated from the wholly wound condition of the webbing 24 to the maximum unwound condition thereof.

Description will now be given of operation of the first embodiment according to the present invention.

FIG. 2 shows the condition that the webbing 24 is wound on to the takeup shaft 24 in the maximum amount, in which the arm 84 is put in the situation that the engaging click 84A can be biased in the direction of separation from the ratchet teeth 56 by the engaging projection 80 and the locking wheel 50 is put in the situation to be rotatable in accordance with the rotation of the takeup shaft 22.

In consequence, when the occupant unwinds the webbing 24 from the webbing retractor 10 in order to wear it, the locking wheel 50 is rotated in accordance with the rotation of the takeup shaft 22 and the occupant can wear the webbing 24. Thus, the webbing retractor 10 can be used as the ELR.

Accordingly, when the vehicle falls in such an emergency situation as a collision during its running condition, the inertial ball 62 pushes up the pawl 58 and causes it to come into mesh with the ratchet teeth 56 to thereby stop the rotation of the ratchet teeth 56. Simultaneously therewith the occupant wearing the webbing 24 is moved in the direction of the collision by an inertial force, whereby the webbing 24 is unwound to rotate the takeup shaft 22.

However, as the rotation of the locking wheel 50 is stopped, the takeup shaft 22 drives the lock plates 34 and 36 in the opposite directions to each other and causes them to come into mesh with the internal gear ratchet wheel 30, as shown in FIG. 5. As a result, the takeup shaft 22 is stopped from rotation in the unwinding direction of the webbing 24, so that the webbing 24 puts the occupant in a restrained situation.

In case that the occupant operates the webbing retractor 10 as the ALR, he only puts the webbing 24 in its maximum unwound situation. In other words, the engaging projection 80 rotated in the direction of the arrow B of FIG. 2 by the unwinding of the webbing 24 abuts upon the reverse side of the arm 84 and causes the engaging click 84A to come into mesh with the ratchet wheel 56, as shown in FIG. 7. Accordingly, the locking wheel 50 is prevented from rotation in the webbing unwinding direction.

As a result, when the webbing 24 is unwound, the lock plates 34, 36 come into mesh with the internal gear ratchet wheel 30, as shown in FIG. 5, so that the unwinding of the webbing 24 is stopped in the same manner as the condition that the pawl 58 is in mesh with the ratchet teeth 56 by the inertial ball 62.

However, since the unwinding of the webbing 24 is stopped, as described above, but the winding thereof can be effected, the webbing retractor 10 functions as a webbing retractor provided with the automatic locking mechanism when an occupant or a baggage wears the webbing 24, so that it restrains the occupant or the baggage surely. Especially, in case that the webbing retractor 10 is operated as the webbing retractor provided with the automatic locking mechanism, the baggage can be restrained securely to the seat by fixing it to the seat with the webbing 24 even in such an small acceleration range that the inertial ball 62 is not worked, so that the baggage does not move on the seat.

Next, the release of the automatic locking mechanism can be conducted by releasing the wearing of the webbing 24 on to the occupant, the baggage or the like and by winding the webbing 24 on to the takeup shaft 22 in its whole amount. That is, the rotatable ring 70 is rotated in the direction of the arrow A shown in FIG. 7 in accordance with the webbing-winding rotation of the takeup shaft 22, so that the engaging click 84A is sufficiently separated from the ratchet teeth 56 just before the webbing 24 is wholly wound on to the takeup shaft 22, as shown in FIG. 2, and when the end of the torsion coil spring 86 fixed to the arm 84 passes the boundary point the biasing force of the torsion coil spring 86 is reversed. Accordingly, the webbing retractor 10 can be used as the ELR, again.

During the above operation of the webbing 24 the arm 84 does not contact with the engaging projection 80 of the rotatable ring 70 except the whole winding condition of the webbing 24 and the whole unwinding condition thereof. Accordingly, the biasing force of the torsion coil spring 86 is not reversed carelessly and the webbing retractor 10 can be operated reliably.

Figure 8:
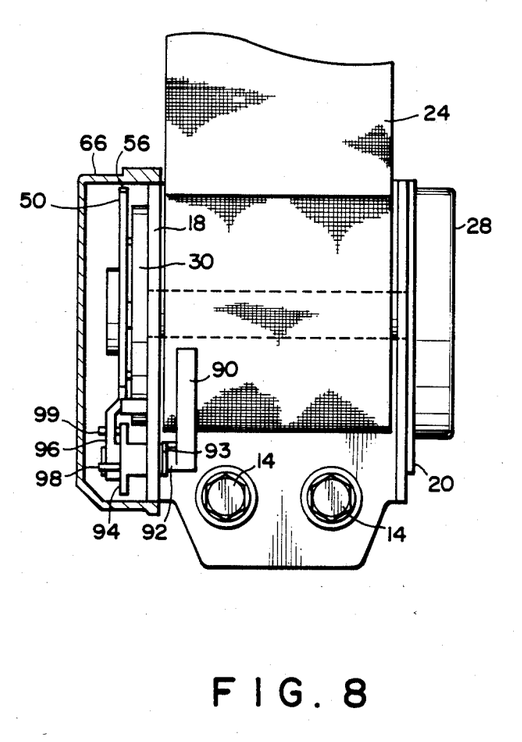
FIG. 8 is a front view showing a webbing retractor of a second embodiment of the present invention corresponding to FIG. 1.
Figure 9:
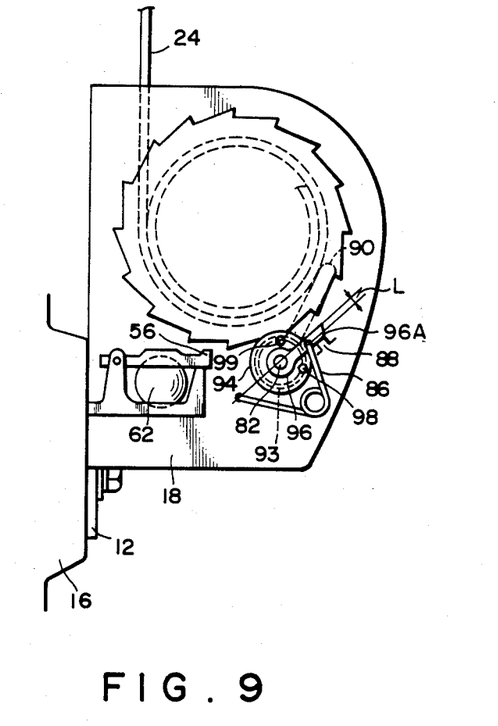
FIG. 9 is a left side view of FIG. 8 corresponding to FIG. 2.
Figure 10:
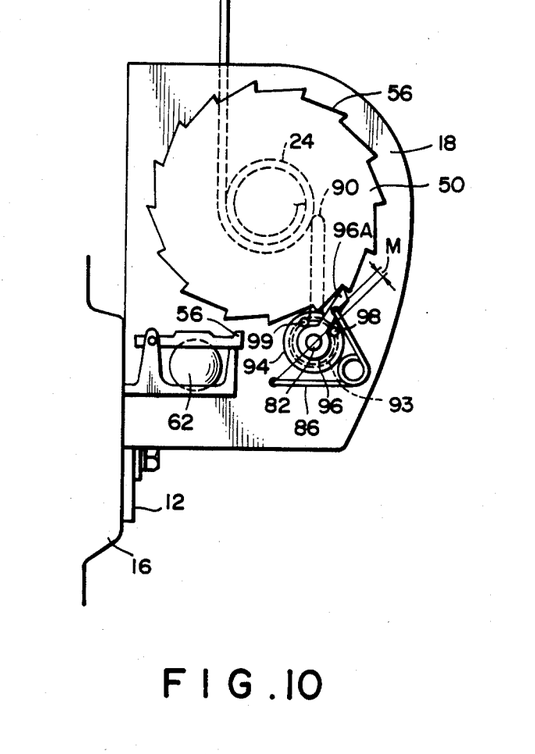
FIG. 10 is an explanation view of the operation condition of FIG. 9.
Figure 11:
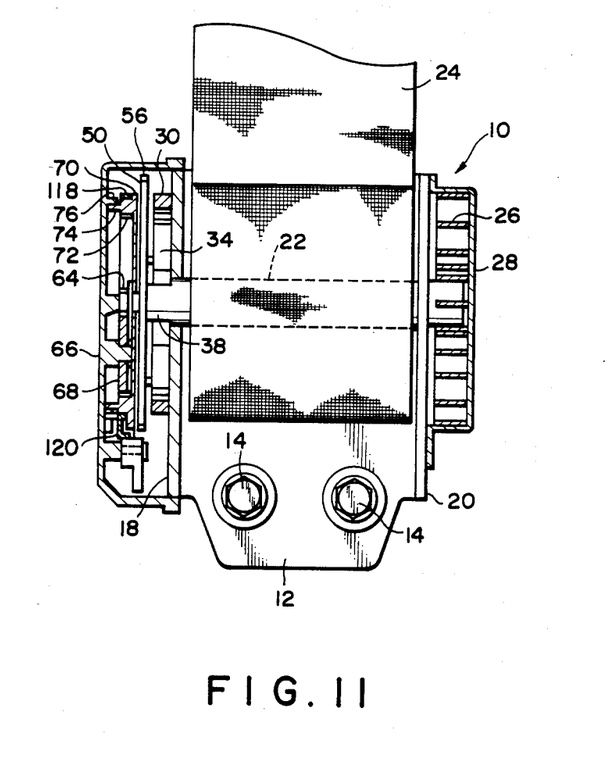
FIG. 11 is a front view showing a webbing retractor of a third embodiment of the present invention corresponding to FIG. 1.

A second embodiment according to the present invention is described below with reference to FIGS. 8 through 10.

In the second embodiment a detecting lever 90 is pivoted to the leg plate 18 and is applied to detect the deviation of the amount of the webbing 24 wound on to the takeup shaft 22. The detecting lever 90 is fixed to an axis 92 pivoted to the leg plate 18 and a tip end portion thereof is caused to abut on the outer periphery of the webbing 24 wound in layers on to the takeup shaft 22 by a biasing force of a torsion coil spring 93.

The axis 92 penetrates the leg plate 18 and is fixed to a disk 94 at the outside of the leg plate 18.

Rotatably supported to the disk 94 coaxially therewith is an arm 96, and confined between the arm 96 and the leg plate 18 is a torsion coil spring 86, so that an engaging click 96A formed on a tip portion of the arm 96 can selectively be biased either in the direction of approach to the ratchet teeth 56 or in the direction of separation therefrom in the same manner as the first embodiment set forth above.

In addition, the disk 94 is projected with a pair of pins 98, 99 at both the sides of the arm 96. The pin 98 is caused to abut on the arm 96, when the webbing 24 is unwound in its whole amount, as shown in FIG. 10, and reverses its biasing force to the arm 96 in the direction of approach to the ratchet teeth 56. On the other hand, the pin 99 is caused to abut on the arm 96, when the webbing 24 is wound in its whole amount, and reverses the biasing force to the arm 96 in the direction of separation from the ratchet teeth 56.

Accordingly, the webbing retractor 10 according to the second embodiment can also be used selectively as either the ELR or the ALR in accordance with the deviation of the webbing-unwinding amount.

Next, FIGS. 11 through 16 show a third embodiment according to the present invention.

Figure 12:
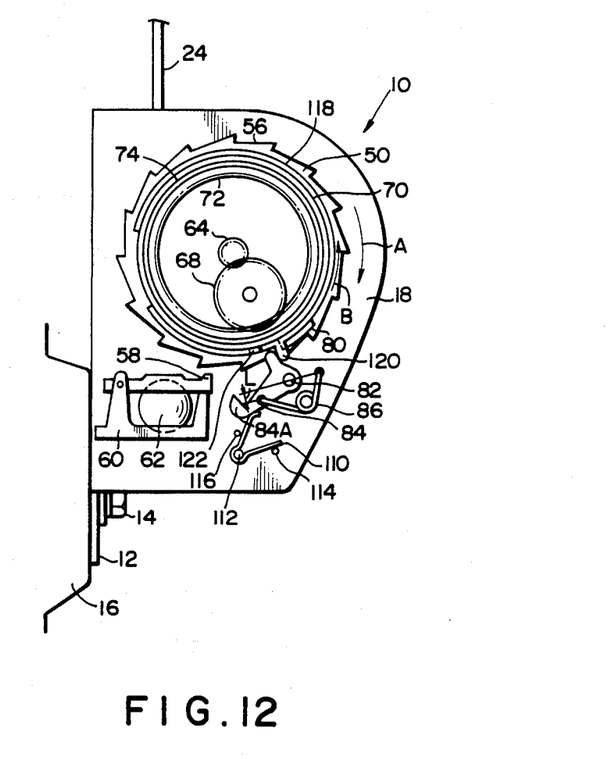
FIG. 12 is a left side view of the webbing retractor shown in FIG. 11 from which a cover is removed.

In the third embodiment, opposed to the engaging click 84A of the arm 84, instead of the stopper 88 used in the above first embodiment, is one end of a leaf spring 110 which functions as a damping means. That is, the leaf spring 110 is engaged at its central portion with the leg plate 18 through a pin 112 and the other end portion of the leaf spring 110 contrary to the one end opposed to the engaging click 84A is also engaged with the leg plate 18 through a pin 114, whereby the leaf spring 110 reveals a resistant force to an external force acting in such a direction that a narrower angle of the leaf spring 110 between both the end portions of the leaf spring 110 is decreased. Also the one end portion of the leaf spring 110 opposed to the engaging click 84A is engaged with the leg plate 18 through another pin 116, so that the leaf spring 110 reveals a resistant force to an external force acting in the same direction as the above.

Figure 14:
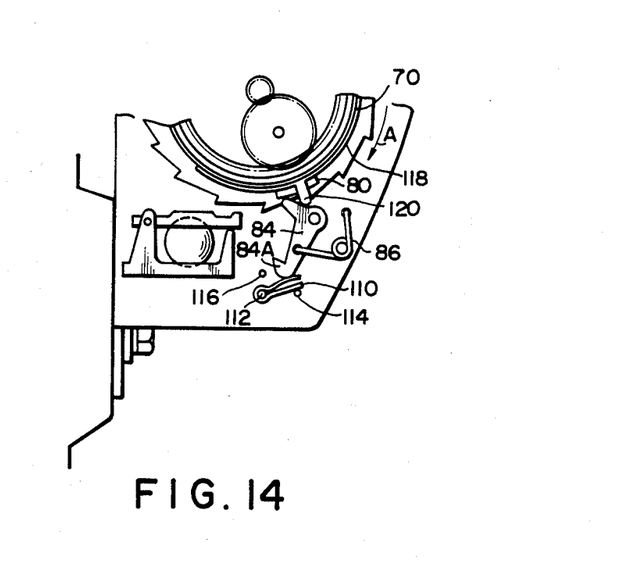
FIG. 14 is an operational view of FIG. 12 showing a maximum winding condition of a webbing.
Figure 15:
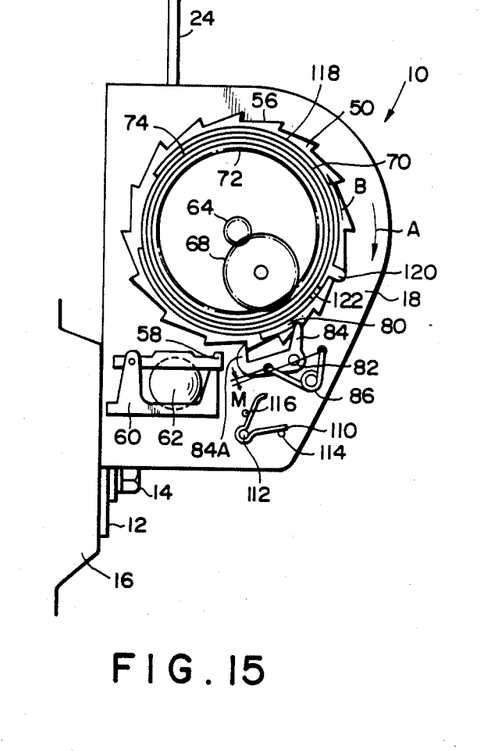
FIG. 15 is an operational view of FIG. 12 showing the condition that the webbing retractor functions as an ALR.

In consequence, the engaging click 84A of the arm 84 is rotatable from the condition of FIG. 12 in the direction of separation from the ratchet teeth 56 upto the condition of FIG. 14, while it is resistant to a biasing force of the leaf spring 110.

In the third embodiment, thus, as the leaf spring 110 constitutes the damping means, the engaging projection 80 pushes up the arm 84 to move, as shown in FIG. 14, even though there is dispersion in length of the webbing 24, whereby an unexpected stress does not act upon the engaging projection 80 and the arm 84.

Figure 13:
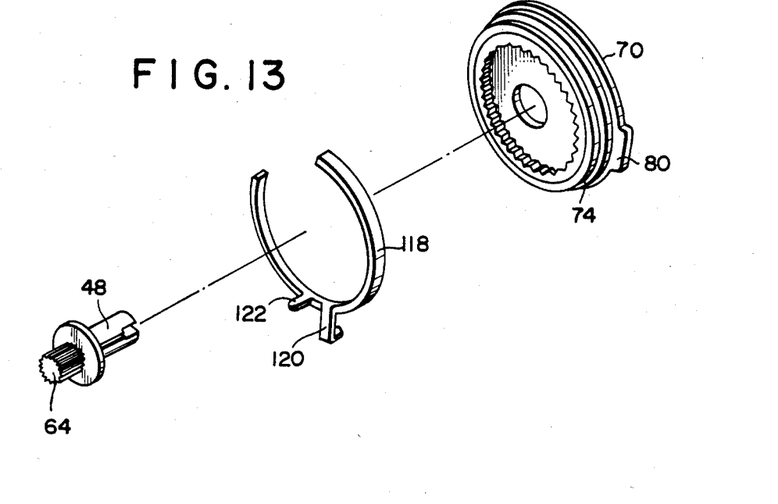
FIG. 13 is a disassembled perspective view of a part of the webbing retractor shown in FIG. 12.

In the third embodiment, mounted on to the outer periphery of the rotatable ring 70 is a frictional ring 118, as shown in FIG. 13. The frictional ring 118 is made of a leaf spring material, constitutes a supporting means and is of a substantial C-shape, fastening the outer periphery of the rotatable ring 70 by its elastic force.

The frictional ring 118 is formed at a portion thereof with a L-shaped engaging projection 120 which is opposed to the arm 84. Also, the frictional ring 118 is provided close to the engaging projection 120 with a linear detect projection 122 which is received in a guide groove, not shown, formed on the cover 66. The frictional ring 118 is rotatable along the guide groove of the cover 66 between the condition of FIG. 15 and that of FIG. 16.

Figure 16:
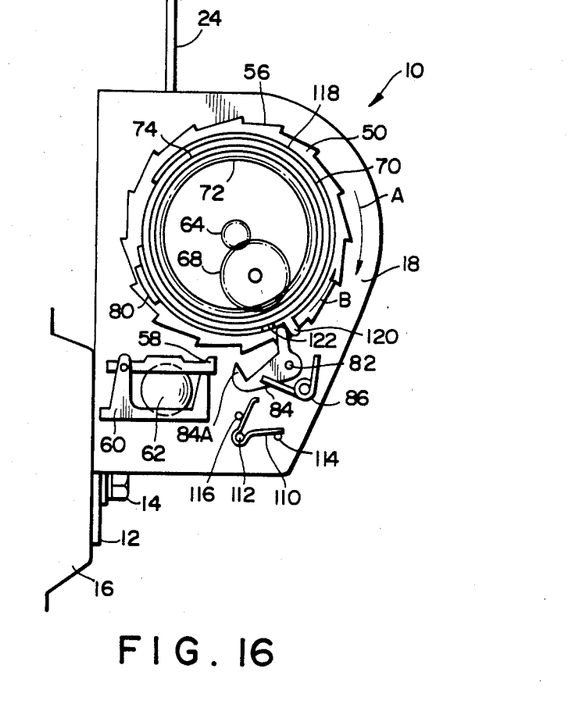
FIG. 16 is an operational view of FIG. 12 showing the condition that the webbing is wound.

In the condition of FIG. 16 situated in a course of the webbing winding rotation, the engaging projection 120 causes the arm 84 to rotate, while it is resistant to the biasing force of the torsion coil spring 86, and separates the engaging click 84A from the ratchet teeth 56. However, the engaging projection 120 does not cause the arm 84 to rotate up to the boundary point shown in FIG. 12 where the biasing force of the torsion coil spring 86 is reversed, so that the torsion coil spring 86 maintains a biasing force pushing the engaging click 84A to the ratchet teeth 56.

Accordingly, in case that the webbing 24 is wound largely on to the takeup shaft 22, for example, the occupant releases the wear of the webbing 24, the engaging click 84A is separated from the ratchet teeth 56, whereby noises due to repeated collisions between the engaging click 84A and the ratchet teeth 56 can be prevented from occurring.

Except the above-described construction the third embodiment has the same construction as the first and second embodiments, and, therefore, the former has the substantially same functions and effects as the latters.

The present invention is not limited only to the above-described embodiments but is applicable to all of such control means as being biased in the direction of separation from the locking wheel when the webbing winding amount reaches a predetermined value and being biased in the direction of approach to the locking wheel when the webbing unwinding amount reaches another predetermined value.

What is claimed is:

1. A webbing retractor for use in a seatbelt system for protecting an occupant in a vehicular emergency situation, comprising
    (a) a rotatable takeup shaft for winding a webbing thereon;
    (b) a locking wheel connected to said shaft to rotate in a lagging relationship with said shaft above a certain angular acceleration, wherein said locking wheel is circumscribed by a plurality of ratchet teeth;
    (c) a ratchet ring member having a plurality of ratchet teeth around its inner diameter;
    (d) at least one locking plate connected to said locking wheel, wherein said plate has a plurality of rachet teeth which are meshable with the teeth of the ratchet ring member when said locking wheel rotates in lagging relationship with said shaft;
    (e) an acceleration sensor having means for stopping the rotation of the locking wheel relative to the takeup shaft in a vehicular emergency situation, and
    (f) a control means including a pivotable arm having first and second ends, wherein said first end is engageable with and disengageable from the ratchet teeth of the locking wheel, and an arm-pivoting means actuated by said takeup shaft for pivoting the first end of the arm into ratchet-locking engagement with the teeth of the locking wheel when a predetermined amount of webbing is unwound from the takeup shaft so that said web is prevented from unwinding but may be wound upon takeup shaft, and for disengaging said first end of said arm from said ratchet teeth when a predetermined amount of webbing is wound back onto said takeup shaft, so that said web may be wound and unwound from said takeup shaft.

2. A webbing retractor for use in a seatbelt system for protecting an occupant in a vehicular emergency situation, comprising
    (a) a rotatable takeup shaft for winding a webbing thereon;
    (b) a locking wheel connected to said shaft to rotate in a lagging relationship with said shaft above a certain angular acceleration, wherein said locking wheel is circumscribed by a plurality of ratchet teeth;
    (c) a ratchet ring member having a plurality of ratchet teeth around its inner diameter;
    (d) at least one locking plate connected to said locking wheel, wherein said plate has a plurality of ratchet teeth which are meshable with the teeth of the ratchet ring member when said locking wheel rotates in lagging relationship with said shaft;
    (e) an acceleration sensor having means for stopping the rotation of the locking wheel relative to the takeup shaft in a vehicular emergency situation, and
    (f) a control means including a speed-reducing gear arrangement, a rotatable ring mechanically engaged with said gear arrangement, a pivotable arm having first and second ends, wherein said first end is in engagement with and disengageable from the ratchet teeth of the locking wheel, and a projection on the periphery of the rotatable ring engageable with said second end of the arm for pivoting the first end of the arm into ratchet-locking engagement with the teeth of the locking wheel when a predetermined amount of webbing is unwound from the takeup shaft so that the web is prevented from unwinding but may be wound up the takeup shaft, and for disengaging said first end of said arm from said ratchet teeth when a predetermined amount of webbing is wound back onto said takeup shaft, so that said web may be wound and unwound from said takeup shaft.

3. A webbing retractor for use in a seatbelt system for protecting an occupant in a vehicular emergency situation, comprising (a) a rotatable takeup shaft for winding a webbing thereon; (b) a locking wheel carried by said shaft to be rotated in a lagging relationship with said shaft above a preselected angular acceleration, wherein said locking wheel is circumscribed by a plurality of ratchet teeth; (c) locking means connected to said locking wheel, whereby the takeup shaft is prevented from its webbing-unwinding rotation when said locking wheel rotates in lagging relationship with said takeup shaft; (d) means for stopping the rotation of the locking wheel relative to the takeup shaft in a vehicular emergency situation; and (e) a control means including a pivotable arm having first and second ends, wherein said first end is engageable with and disengageable from the ratchet teeth of the locking wheel, and an arm-pivoting means actuated by said takeup shaft for pivoting the first end of the arm into ratchet-locking engagement with the teeth of the locking wheel when a predetermined amount of webbing is unwound from the takeup shaft and for disengaging said first end of said arm from said ratchet teeth when a predetermined amount of webbing is wound back onto said takeup shaft, whereby said webbing may be wound and unwound from said takeup shaft.

4. A webbing retractor as set forth in claim 3, wherein said arm-pivoting means includes a speed reducing gear arrangement for transmitting the rotation of the takeup shaft to a rotatable ring on its outer peripheral portion by means of an engaging projection which abuts the second end of the arm to cause the first end to engage the locking wheel when the predetermined amount of the webbing is unwound from the takeup shaft.

5. A webbing retractor as set forth in claim 4, further including a biasing means, wherein said privotable arm is caused to rapidly approach or separate from the locking wheel by said biasing means when said arm is rotated beyond a given value in one direction or the reverse of said direction.

6. A webbing retractor as set forth in claim 5, wherein the biasing means is an elastic body and said pivotable arm is moved rapidly thereby when the arm rotationally passes a boundary point in the one direction and the reverse direction.

7. A webbing retractor as set forth in claim 6, wherein the pivotable arm is pivoted on a leg plate that rotatably supports the takeup shaft, and the elastic body acts to bias the arm in the one direction or the reverse direction thereto in accordance with the position of a point of the pivotable arm secured to the elastic body with respect to a line passing through a point of the elastic body supported by the leg plate and a point of the arm pivoted to the leg plate.

* * * * *